United States Patent
Lee et al.

(10) Patent No.: US 11,629,670 B2
(45) Date of Patent: Apr. 18, 2023

(54) INJECTION DEVICE FOR LIQUID ROCKET

(71) Applicant: KOREA AEROSPACE RESEARCH INSTITUTE, Daejeon (KR)

(72) Inventors: Keum Oh Lee, Daejeon (KR); Byoung Jik Lim, Daejeon (KR); Kee Joo Lee, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/516,465

(22) Filed: Nov. 1, 2021

(65) Prior Publication Data

US 2022/0145832 A1 May 12, 2022

(30) Foreign Application Priority Data

Nov. 6, 2020 (KR) .................. 10-2020-0147428

(51) Int. Cl.
*F02K 9/52* (2006.01)
*F02K 9/95* (2006.01)
*F02K 9/60* (2006.01)
*B33Y 80/00* (2015.01)

(52) U.S. Cl.
CPC .............. *F02K 9/52* (2013.01); *F02K 9/60* (2013.01); *F02K 9/95* (2013.01); *B33Y 80/00* (2014.12); *F05D 2260/99* (2013.01)

(58) Field of Classification Search
CPC ..... F02K 9/44; F02K 9/52; F02K 9/60; F02K 9/62; F02K 9/95; F05D 2260/99
See application file for complete search history.

(56) References Cited

U.S. PATENT DOCUMENTS

| 2013/0318943 | A1* | 12/2013 | Indersie | F02K 9/52 60/200.1 |
|---|---|---|---|---|
| 2018/0073465 | A1* | 3/2018 | Le Cras | F02K 9/42 |
| 2018/0087701 | A1* | 3/2018 | Adriany | F02M 61/1806 |

FOREIGN PATENT DOCUMENTS

| JP | 2005061385 A | 3/2005 |
| JP | 2011017322 A | 1/2011 |
| KR | 1020100121748 | 11/2010 |
| KR | 1020190045244 | 5/2019 |

OTHER PUBLICATIONS

English translation of JP2005061385A (original foreign patent document has already been provided by Applicant, this Office action merely provides an English translation of the Japanese publication) (Year: 2005).*

* cited by examiner

*Primary Examiner* — Scott J Walthour
(74) *Attorney, Agent, or Firm* — Quarles & Brady LLP

(57) ABSTRACT

An injection device for injecting an oxidizer for a liquid rocket includes a housing, a plate disposed inside the housing and having an injection hole to eject an oxidizer, a duct disposed above the plate to guide the oxidizer, and a manifold with one end connected to the injection hole of the plate and the other end connected to the duct, wherein the oxidizer may be distributed to the injection hole at an equal flow rate.

5 Claims, 6 Drawing Sheets

INJECTION DEVICE FOR LIQUID ROCKET

CROSS-REFERENCE TO RELATED APPLICATION

This application claims the benefit of Korean Patent Application No. 10-2020-0147428 filed on Nov. 6, 2020, in the Korean Intellectual Property Office, the entire disclosure of which is incorporated herein by reference for all purposes.

BACKGROUND

Field of the Disclosure

One or more example embodiments relate to an injection device for injecting an oxidizer in a liquid rocket. Specifically, an injection device for a liquid rocket that distributes an oxidizer to injection holes at an equal flow rate without a distributor, has high structural efficiency because it can be arranged in a narrow space, and is insignificantly affected by a perturbation in a combustion chamber is disclosed.

Description of the Background of the Disclosure

A liquid rocket is a rocket using liquid propellants. Thrust is generated by ejecting gas by the chemical combustion reaction of a fuel and an oxidizer. A liquid rocket has its excellent performance and long burning time and thus is widely used in rockets for launching satellites.

A liquid rocket uses an injection device that injects an oxidizer having a combustion reaction with fuels. The injection device atomizes and injects the oxidizer into the combustion chamber in a state appropriate for combustion.

Since the injection device includes many components, has a lower structural efficiency when there is a residual oxidizer, and requires a high cost for manufacturing, there is a need for a device to alleviate such issues.

Korean Patent Application Publication No. 10-2010-0121748 discloses a bipropellant rocket engine using heat of hydrogen peroxide decomposition and a propulsion method thereof.

The above description is information the inventor(s) acquired during the course of conceiving the present disclosure, or already possessed at the time, and is not necessarily art publicly known before the present application was filed.

SUMMARY

Example embodiments provide an injection device for a liquid rocket that may erect a manifold without a support member and reduce a space of the manifold, thereby being arrangeable in narrow space and increasing the structural efficiency.

Example embodiments provide an injection device for a liquid rocket that may be insignificantly or little affected by perturbation of a combustion chamber and a nozzle due to a manifold having a narrow and long (elongated) inner space.

Example embodiments provide an injection device for a liquid rocket that may distribute an oxidizer to injection holes at an equal flow rate without a distributor and may be integrally manufactured by a 3D printer at a low cost.

The technical tasks obtainable from the present disclosure are non-limited by the above-mentioned technical tasks. And, other unmentioned technical tasks can be clearly understood from the following description by those having ordinary skill in the technical field to which the present disclosure pertains.

According to an aspect, there is provided an injection device for injecting an oxidizer for a liquid rocket, the injection device including a housing, a plate disposed inside the housing and having an injection hole to eject an oxidizer, a duct disposed above the plate to guide the oxidizer, and a manifold with one end connected to the injection hole of the plate and the other end connected to the duct, wherein the oxidizer may be distributed to the injection hole at an equal flow rate.

The injection device may further include a spark plug disposed in a center of the plate to ignite fuel and the oxidizer, wherein a plurality of injection holes may be arranged around the spark plug.

The manifold may include a plurality of tubes, and each of the plurality of tubes may be connected to a respective corresponding injection hole.

The plurality of tubes may include a first tube group and a second tube group, and the first tube group may be disposed on a first side with the spark plug as the center, and the second tube group may be disposed on a second side opposite to the first side.

A longitudinal direction of the injection hole and a longitudinal direction of the duct may be arranged non-parallel, and the tubes may be curved and connected from the injection holes to the duct.

Each of the plurality of tubes may include a reinforcing member disposed at one end connected to the injection hole.

The housing may be provided in the shape of a cylinder with a hollow inside, the plate may be disposed in a central portion of the housing, and a tapered slope may be formed from an upper side of the housing toward the plate.

The housing, the plate, the duct and the manifold may be integrally manufactured by a 3D printer.

Additional aspects of example embodiments will be set forth in part in the description which follows and, in part, will be apparent from the description, or may be learned by practice of the disclosure.

According to example embodiments, an injection device for a liquid rocket may erect a manifold without a support member and reduce a space of the manifold, thereby being arrangeable in narrow space and increasing the structural efficiency.

According to example embodiments, an injection device for a liquid rocket may be insignificantly or little affected by perturbation of a combustion chamber and a nozzle due to a manifold having a narrow and long (elongated) inner space.

According to example embodiments, an injection device for a liquid rocket may distribute an oxidizer to injection holes at an equal flow rate without a distributor and may be integrally manufactured by a 3D printer at a low cost.

The effects of the injection device for a liquid rocket are not limited to the above-mentioned effects, and other unmentioned effects can be clearly understood from the following description by one of ordinary skill in the art.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

Figure 1:
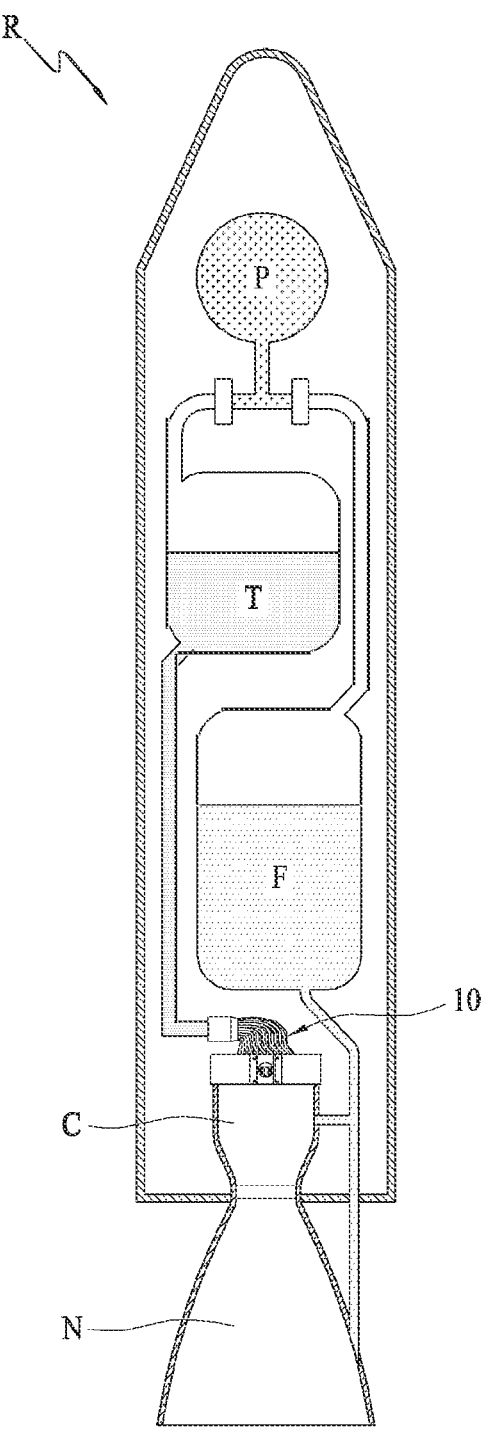
FIG. 1 is a schematic conceptual diagram of a liquid rocket equipped with an injection device for a liquid rocket according to an example embodiment.

The accompanying drawings illustrate preferred example embodiments of the present disclosure, and are provided together with the detailed description for better understanding of the technical idea of the present disclosure. Therefore, the present disclosure should not be construed as being limited to the example embodiments set forth in the drawings.

DETAILED DESCRIPTION

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Figure 2:
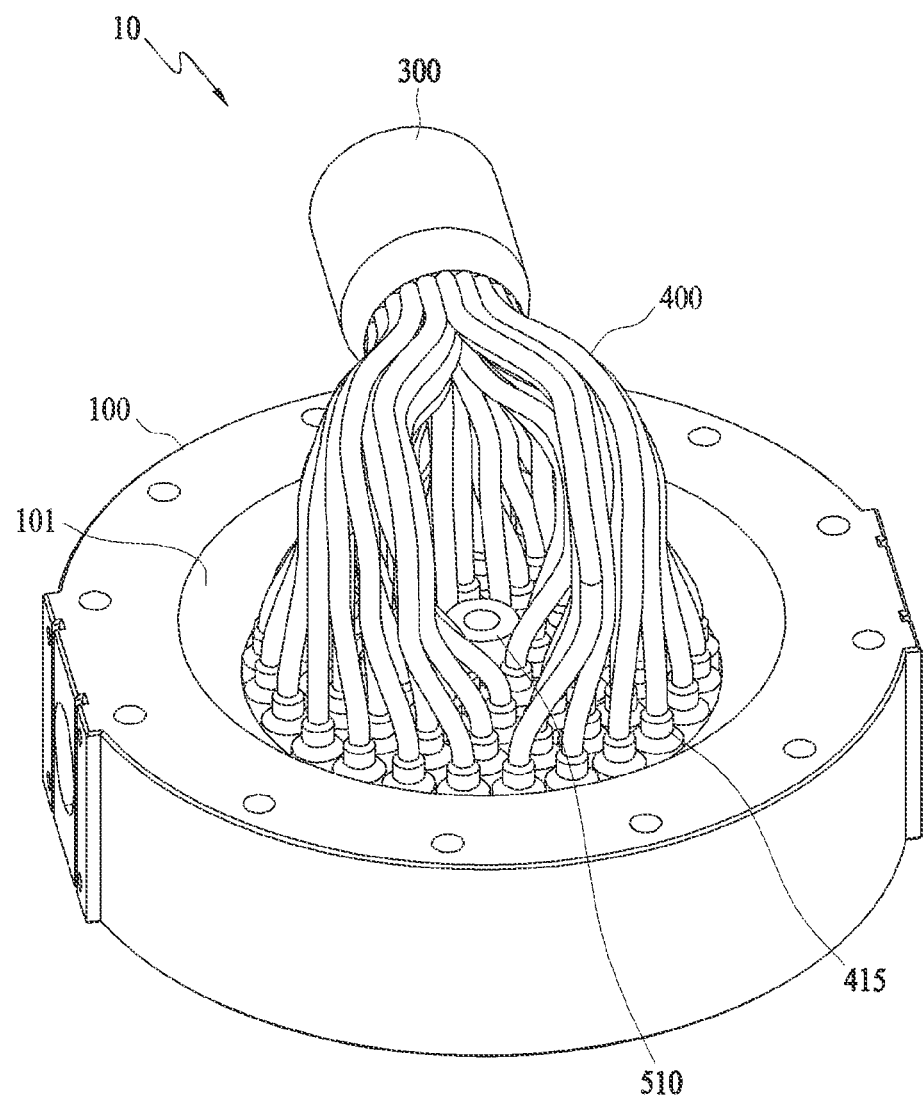
FIG. 2 is a perspective view of an injection device according to an example embodiment.
Figure 3:
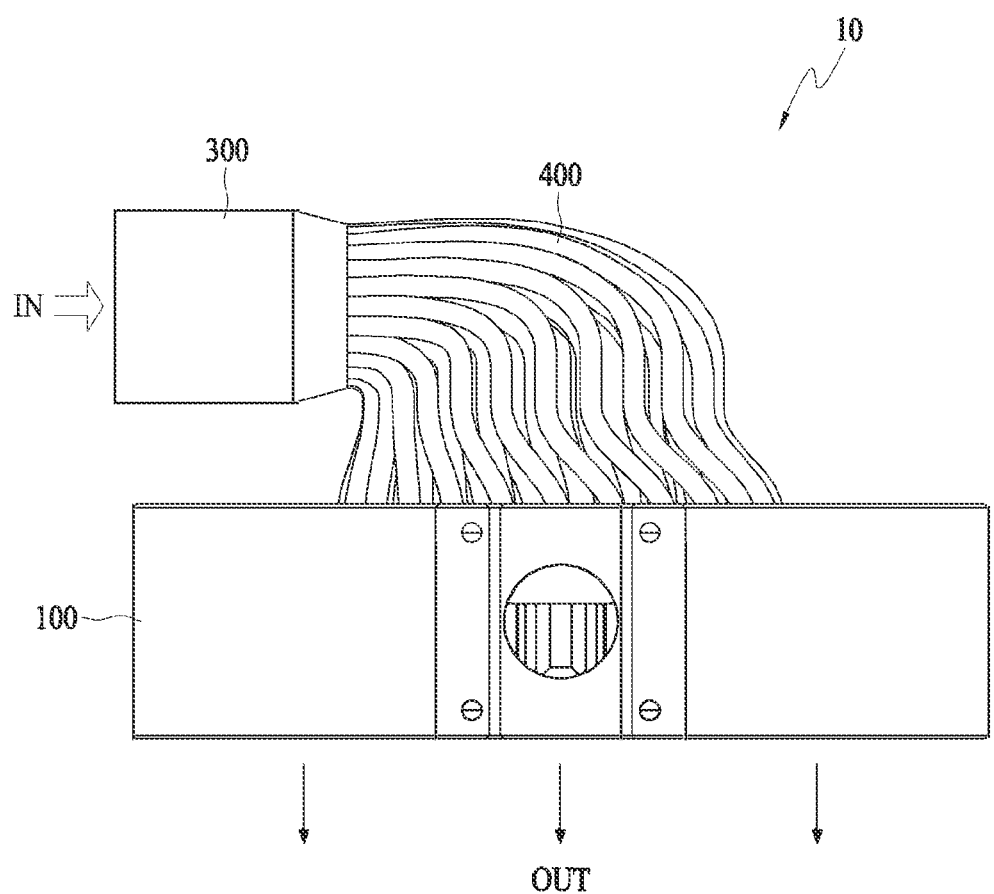
FIG. 3 is a side view of an injection device according to an example embodiment.
Figure 4:
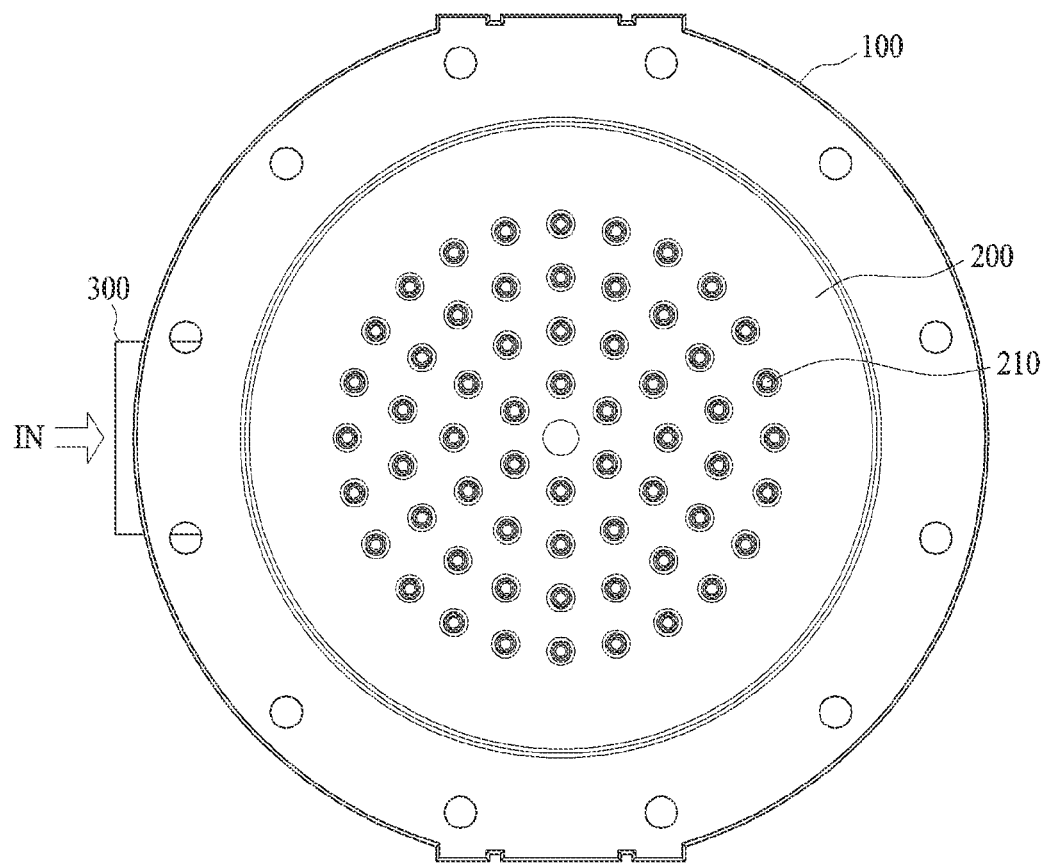
FIG. 4 is a bottom view of an injection device according to an example embodiment.
Figure 5:
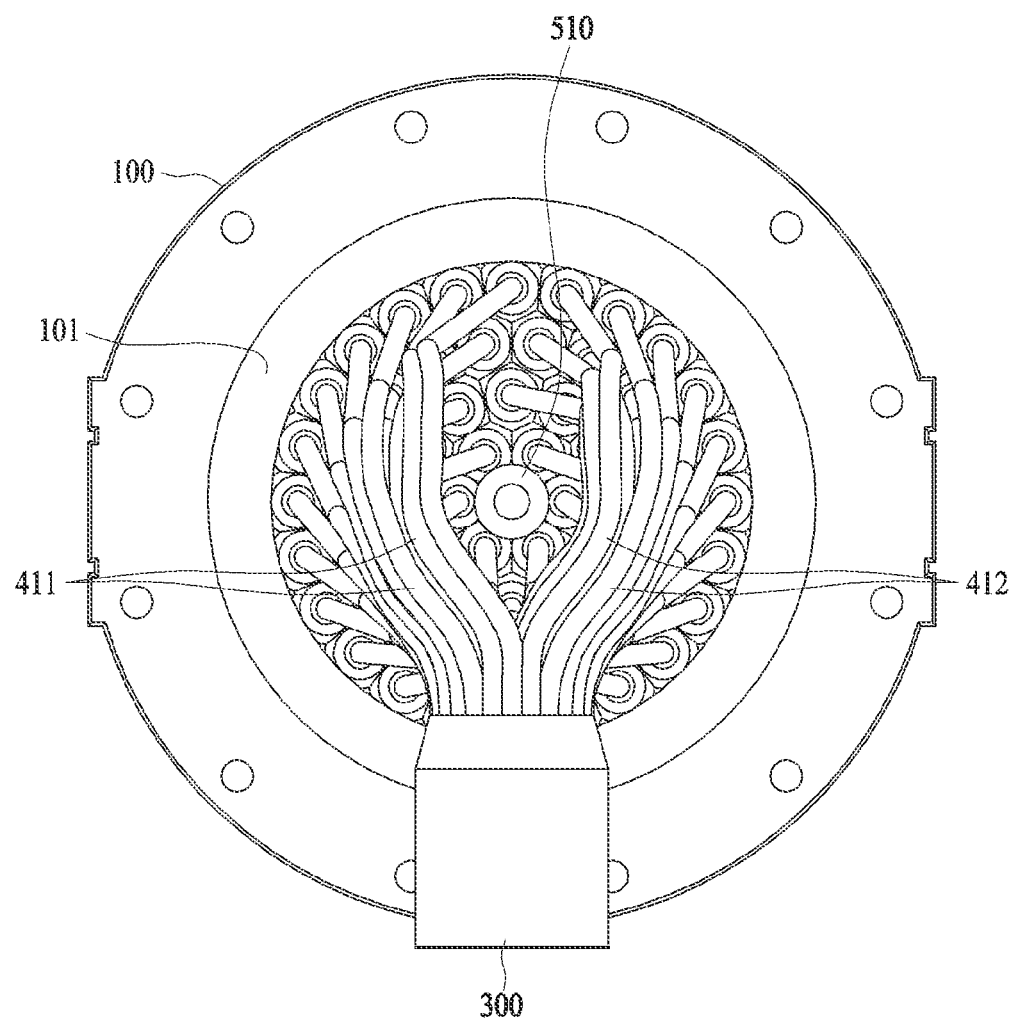
FIG. 5 is a plan view of an injection device according to an example embodiment.
Figure 6:
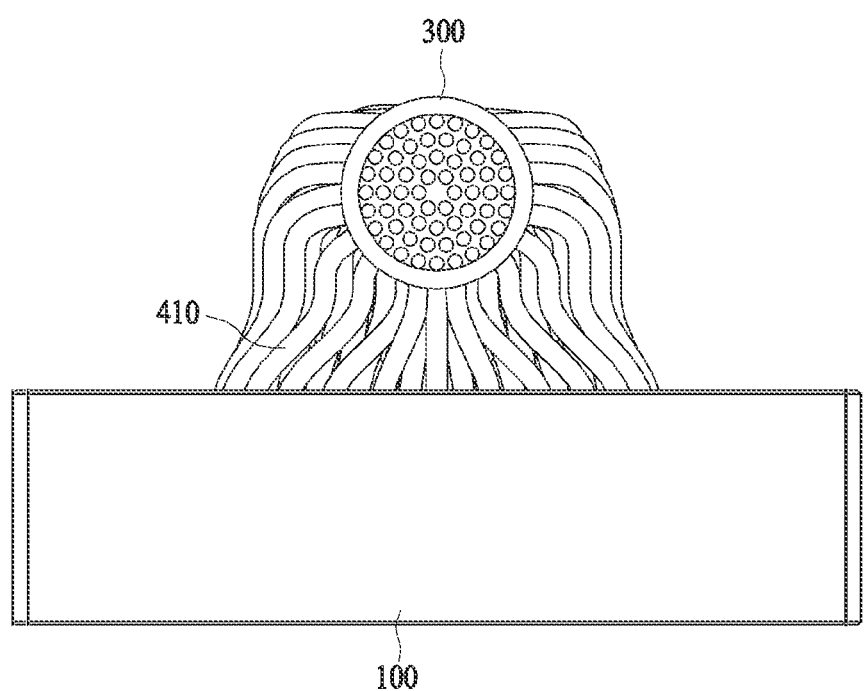
FIG. 6 is a rear view of an injection device according to an example embodiment.

FIG. 1 is a schematic conceptual diagram of a liquid rocket R equipped with an injection device 10 for a liquid rocket according to an example embodiment, FIG. 2 is a perspective view of the injection device 10 according to an example embodiment, FIG. 3 is a side view of the injection device 10 according to an example embodiment, FIG. 4 is a bottom view of the injection device 10 according to an example embodiment, FIG. 5 is a plan view of the injection device 10 according to an example embodiment, and FIG. 6 is a rear view of the injection device 10 according to an example embodiment.

Referring to FIGS. 1 to 6, the injection device 10 for injecting an oxidizer for a liquid rocket may include a housing 100, a plate 200 disposed inside the housing 100 and having injection holes 210 to eject the oxidizer, a duct 300 disposed above the plate 200 to guide the oxidizer, and a manifold 400 with one end connected to the injection holes 210 of the plate 200 and the other end connected to the duct 300.

Referring again to the large configuration in FIG. 1, the liquid rocket R may include a pressure tank P, an oxidant tank T, a fuel tank F, the injection device 10, a combustion chamber C, and a nozzle N. An oxidizer in the oxidizer tank T may reach the injection device 10 by the pressure of the pressure tank P, and the injection device 10 may eject the oxidizer to the combustion chamber C in an atomized form (e.g., aerosol form). In the combustion chamber C, the oxidizer and the fuel in the fuel tank F may meet and be ignited by a spark of a spark plug (not shown) to be combusted. At this time, the fuel in the fuel tank F may reach the combustion chamber C by the pressure of the pressure tank P.

The injection device 10 may be disposed on the top of the combustion chamber C as a combustor head to control the flow rate of the oxidizer, whereby the thrust of the liquid rocket R may be controlled.

Referring back to FIGS. 2 to 6, the housing 100 may be provided in the shape of a cylinder with a hollow inside. In addition, the plate 200 may be disposed at a lower portion of a central portion of the housing 100, and a tapered slope 101 may be formed from an upper side of the housing 100 toward the plate 200. The tapered slope 101 may be provided to reduce the weight of the injection device 10 by removing unnecessary space and to secure a manufacturing space for the manifold 400 when the injection device 10 is manufactured. The housing 100 may accommodate the other components, that is, the plate 200, the duct 300, the manifold 400 and the spark plug (not shown), and may be connected and coupled to the top of the combustion chamber C. For coupling, the housing 100 may include a plurality of openings on a circumference of the housing 100. Through the plurality of openings, the housing 100 may be coupled to the top of the combustion chamber C by a method such as bolting or flange fastening.

The injection device 10 may further include the spark plug (not shown) disposed in the center of the plate 200 to ignite the fuel and the oxidizer. The spark plug may be mounted on the spark plug holder 510, wherein mounting the spark plug may be easily performed through an empty space above the spark plug holder 510, and multiple ignitions may be possible when the spark plug is mounted.

The plate 200 may have the injection holes 210 disposed in the lower portion of the inside of the housing 100 to eject the oxidizer (e.g., liquid oxygen). A plurality of injection holes 210 may be disposed around the spark plug, and each injection hole 210 may be provided in a circular shape. The shape of the injection holes 210 is not limited to the circular shape. The injection holes 210 may also be provided in other shapes that may increase the combustion efficiency. The injection holes 210 may be disposed at predetermined intervals such that the oxidizer may be evenly distributed in the combustion chamber C, and the injection holes 210 may be formed to inject the oxidizer in an atomized form.

The duct 300 may be disposed above the plate 200 to guide the oxidizer. Specifically, the duct 300 may be disposed at an interval from the top of the housing 100 and provided in the shape of a cylindrical pipe to guide the oxidizer flowing in from the oxidizer tank T. The duct 300 may distribute the oxidizer to a plurality of tubes 410 of the manifold 400 without the need for a distributor. In addition, the longitudinal direction of the duct 300 may be disposed non-parallel to the longitudinal direction of the injection holes 210. For example, the duct 300 may be disposed at a position orthogonal to the longitudinal direction of the injection holes 210 and distanced not to interfere with the spark plug (not shown). In some cases, the longitudinal direction of the duct 300 may be parallel to the longitudinal direction of the injection holes 210. However, the duct 300 may be preferably distanced not to interfere with the spark plug (not shown) and the manifold 400. At this time, the manifold 400 may need to open a space so that the spark plug (not shown) may be connected to the spark plug holder 510.

One end of the manifold 400 may be connected to the injection holes 210 of the plate 200, and the other end thereof may be connected to the duct 300. The manifold 400 may include a plurality of tubes, and each of the plurality of tubes may be connected to a respective corresponding injection hole 210. That is, one tube 410 of the manifold 400 may be connected to one injection hole 210. The tube 410 may be configured in the shape of a long and thin (elongated) pipe, and the inside thereof may be configured to have small friction with the oxidizer, thereby allowing smooth flow of the oxidizer. The other ends of the plurality of tubes of the manifold 400 may be all aggregated and connected to the duct 300.

The tubes 410 may be curved and connected from the injection holes 210 to the duct 300. The curved and connected tubes 410 may be provided in shapes having the shortest lengths from the injection holes 210 to the duct 300, under the condition that allows smooth flow of the oxidizer and structural stability. That is, the tubes 410 may be preferably provided in the shape of tubes optimized to increase the performance and decrease the weight. At this time, the plurality of tubes 410 should be provided in the shape not interfering with the spark plug (not shown) on the spark plug holder 510. In addition, the plurality of tubes 410 may preferably open a space when the spark plug is mounted.

The plurality of tubes 410 may include a first tube group 411 and a second tube group 412, wherein the first tube group 411 may be disposed on a first side with the spark plug (not shown) as the center, and the second tube group 412 may be disposed on a second side opposite to the first side. Specifically, as shown in FIG. 5, with a virtual longitudinal line of the duct 300 or a virtual line connecting the spark plug holder 510 and the duct 300 as the center, the left side may be referred to as the first side, and the right side opposite thereto may be referred to as the second side. The first tube group 411 may be disposed on the first side, and the second tube group 412 may be disposed on the second side, whereby the spark plug (not shown) may be easily mounted and arranged on the spark plug holder 510.

The manifold 400 may distribute the oxidizer flowing in from the duct 300 at an equal flow rate and deliver the oxidizer to the injection holes 210, such that the injection holes 210 may equally discharge the oxidizer. In some cases, the tubes 410 may be different in length, and the oxidizer may be discharged from the injection holes 210 at different flow rates. At this time, by manufacturing the respective tubes 410 differently in inner diameter and manufacturing the injection holes 210 having the same inner diameter corresponding to the respective tubes 410, the local flow rate of the oxidizer discharged from the plate 200 may be changed or controlled, whereby the oxidizer may be overall equally discharged. For example, when the inner diameter of injection holes 210 located in a circumferential direction and far from the spark plug arranged in the center of the plate 200 is larger than the inner diameter of injection holes 210 located in the circumferential direction and close to the spark plug, the flow rate of the oxidizer may increase, whereby the oxidizer may be overall equally discharged.

Each of the plurality of tubes 410 of the manifold 400 may include a reinforcing member 415 disposed at one end connected to a corresponding injection hole 210. When reinforcing members 415 are disposed on the outer surface where the tubes 410 and the surface of the plate 200 are connected, the reinforcing members 415 may firmly couple the tubes 410 and the plate 200. In addition, the reinforcing members 415 may prevent fatigue failure in the tubes 410 and the plate 200 that may be caused by vibration of the combustion chamber C or the nozzle N.

The housing 100, the plate 200, the duct 300, the manifold 400, and the spark plug holder 510 may be integrally manufactured by a 3D printer. For example, the housing 100, the plate 200, the duct 300, the manifold 400, and the spark plug holder 510 may be integrally manufactured by a metal 3D printer without an assembly process in manufacturing. The 3D printer may use metal or other various materials to manufacture the injection device 10.

In doing so, the injection device 10 for a liquid rocket according to an example embodiment may erect the manifold 400 without a support member and reduce the space of the manifold 400, thereby being arrangeable in narrow space and increasing the structural efficiency.

Further, the injection device 10 for a liquid rocket according to an example embodiment may be insignificantly or little affected by perturbation of the combustion chamber C and the nozzle N due to the manifold 400 having a narrow and long (elongated) inner space.

In addition, the injection device 10 for a liquid rocket according to an example embodiment may distribute an oxidizer to the injection holes 210 at an equal flow rate without a distributor and may be integrally manufactured by a 3D printer at a low cost.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An injection device for injecting an oxidizer for a liquid rocket, the injection device comprising:
    a housing;
    a plate disposed inside the housing and having a plurality of injection holes to eject an oxidizer;
    a duct disposed above the plate to guide the oxidizer; and
    a manifold comprising a plurality of tubes that each have a first end connected to only one respective injection hole of the plurality of injection holes and a second end directly connected to the duct at a location above the housing,
    a spark plug disposed in a center of the plate to ignite fuel and the oxidizer,
    wherein the plurality of tubes comprise at least two tubes having different lengths, and wherein the oxidizer is distributed to the injection hole at an equal flow rate,
    wherein the plurality of injection holes are arranged around the spark plug,
    wherein the plurality of tubes comprises a first tube group and a second tube group, and
    the first tube group is disposed on a first side of the spark plug and the second tube group is disposed on a second side opposite to the first side, wherein the spark plug is centered between the first tube group and the second tube group.

2. The injection device of claim 1, wherein a longitudinal direction of each injection hole and a longitudinal direction of the duct are arranged non-parallel, and the plurality of tubes are curved and connected from the plurality of injection holes to the duct.

3. The injection device of claim 1, wherein each tube of the plurality of tubes comprises a reinforcing member disposed at the first end of the respective tube.

4. The injection device of claim 1, wherein the housing is provided in the shape of a cylinder with a hollow inside, the plate is disposed in a central portion of the housing, and a tapered slope is formed from an upper side of the housing toward the plate.

5. The injection device of claim 1, wherein the housing, the plate, the duct and the manifold are integrally manufactured by a 3D printer.

* * * * *